Oct. 2, 1962  J. J. WENT ETAL  3,056,736
NUCLEAR PLANT PROVIDED WITH AN EXPANSIBLE GAS HOLDER
Filed Jan. 11, 1957  2 Sheets-Sheet 1

INVENTORS
JAN J. WENT
BERNARD L.A. VAN DER SCHEE
BY
ATTORNEYS

Oct. 2, 1962 J. J. WENT ETAL 3,056,736
NUCLEAR PLANT PROVIDED WITH AN EXPANSIBLE GAS HOLDER
Filed Jan. 11, 1957 2 Sheets-Sheet 2

JAN J. WENT AND
BERNARD L.A. VAN DER SCHEE
BY: Cushman, Darby & Cushman
ATTORNEYS

United States Patent Office 3,056,736
Patented Oct. 2, 1962

3,056,736
NUCLEAR PLANT PROVIDED WITH AN EXPANSIBLE GAS HOLDER
Jan J. Went and Bernard L. A. van der Schee, Arnhem, Netherlands, assignors to Stichting Reactor Centrum Nederland, 's-Gravenhage, Netherlands
Filed Jan. 11, 1957, Ser. No. 633,766
Claims priority, application Netherlands Jan. 16, 1956
5 Claims. (Cl. 204—193.2)

The present invention relates to nuclear reactor plant for the generation of energy by means of a self-sustaining neutron chain nuclear fission reaction.

In particular, the invention relates to safety measures for guarding the surroundings of said nuclear reactor plant against the scattering of radio-active substances, particularly gases or vapours, as for example may be developed in certain nuclear fission reaction-systems in the event of leakage of a fluid under pressure. In nuclear fission reaction systems fluids are employed for various purposes. Particular mention may be made of the use of common or heavy water as primary or secondary coolant for removing heat energy, as a moderator, as a reflector, and in homogeneous systems as a solvent or carrier liquid for nuclear fuel.

The fluids are often pressurized, particularly in those cases where the energy is recovered at a high temperature level. For example, in systems employing common or heavy water as coolant or carrier for nuclear fuel, the pressure may rise to 100 atmospheres gauge and higher.

Although with the present state of knowledge regarding nuclear reactor design and control techniques, and notably with homogeneous reactors, the risk of the nuclear fission process getting out of control is extremely small, as is also the risk of exothermic chemical reactions, e.g., between molten uranium and water or air, nevertheless the possibility will often have to be envisaged that even without the occurrence of an explosion there might be some plant leakage which would result in the liberation of radio-active gases, vapours, or clouds of dust, which may be laden with gaseous fission products.

For these reasons, and inasmuch as it will usually be quite impracticable to erect the nuclear reactor plant in a completely uninhabited region, it has been proposed to enclose the reactor itself and any other parts of the plant where a leakage resulting in the scattering of radio-active materials could occur, in a pressure resistant shell, e.g., a building or vessel, capable of resisting such pressures as might be encountered in the event of such a plant failure. Even for a small nuclear reactor however, the pressure resistant shell requires to be very large; in one existing plant, a pressure resistant spherical steel shell is employed having a diameter of about 65 meters.

It is the main object of the present invention to provide a nuclear reactor plant of the kind specified in which sufficient safety against the scattering of radio-active substances as hereinbefore indicated is attained without the necessity of the provision of elaborate pressure-resisting structures.

It is a further object of the invention to provide a nuclear reactor plant of the kind specified in which any costly fluid, e.g., heavy water, that would have been scattered in the manner indicated hereinbefore, may be substantially completely recovered in an easy manner.

Further objects of the invention and the entire scope of applicability thereof will become apparent from the detailed description and examples given hereinafter, in the annexed drawing and in the appertaining claims. It should be understood, however, that the detailed description is given by way of illustration and not of limitation.

According to the invention, in a nuclear reactor plant for the generation of energy by means of a self-sustaining neutron chain nuclear fission reaction and requiring the provision of a gas tight enclosure affording sufficient volume for containing radio-active substances which could develop in the event of leakage from the reactor or associated apparatus, the said enclosure comprises a shell enclosing the said reactor and associated apparatus, and an expansible gasholder located separately from said shell and connected to the shell so as to permit gas to flow with little resistance from the shell into the said gasholder.

The capacity of the shell enveloping the reactor may be comparatively small, and it need only have a negligible pressure resistance as compared with a shell which must itself be capable of resisting the maximum internal pressure which could develop in case of an inadvertent or hazardous scattering of radio-active fluids as hereinbefore described.

The total volume which must be available for the expansion of fluids in the event of leakage may be further reduced, according to the present invention, by connecting the shell and the expansible gasholder by way of a condenser so that at least part of the liberated gases or vapours will be condensed. The expansible gasholder is preferably formed as the commonly known wet gasholder, as this will result in a further condensation of the gases or vapours. If heavy water or other costly liquid is employed in the reactor system, this may be substantially completely recovered from the said condenser.

According to an alternative embodiment of the invention, the reactor and associated apparatus from which hazardous scattering of fluids may occur are enclosed in a shell which is itself constructed as an expansible gasholder, e.g., as the commonly known dry gasholder, the nuclear reactor and associated apparatus being located, in this case, within the lower part of the dry gasholder.

In designing apparatus according to the invention, the condensation of gases or vapours owing to the cooling action of the walls of the expansible gasholder and/or the shell enclosing the reactor and associated apparatus may be taken into account with a view to reducing the total space volume which must be available for containing liberated fluids.

The invention will be explained with reference to the annexed drawings, wherein.

Figure 1:
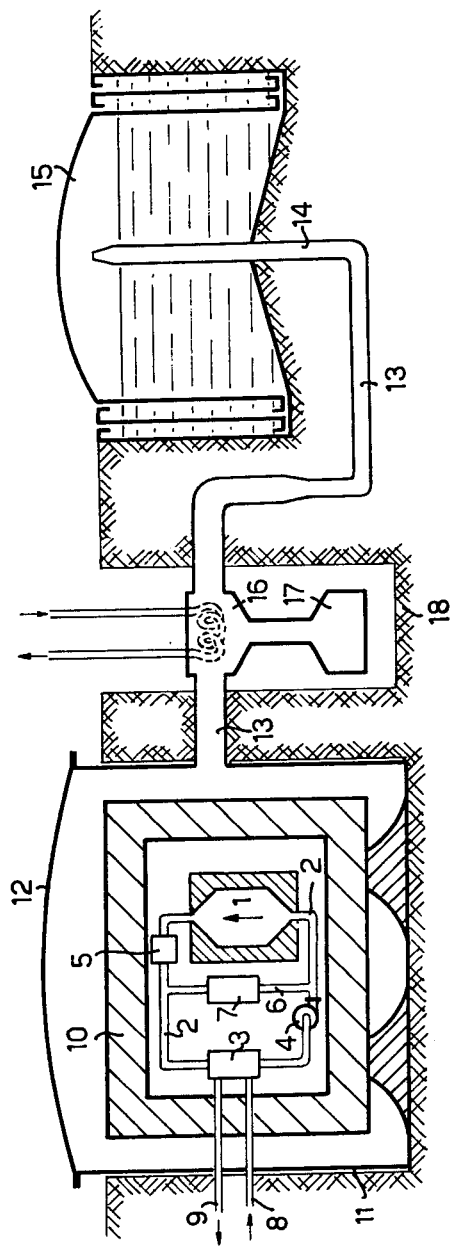
FIGURE 1 is a diagram of a nuclear reactor plant embodying the invention.

The nuclear reactor and associated apparatus appearing in the plant shown in the drawing is described in full details in the co-pending Went application, Serial No. 536,638, filed September 26, 1955.

Referring to FIGURE 1, the plant comprises a reactor vessel 1, a heat exchanger 3 and a circulation conduit 2, through which a suspension of uranium oxide or a similar fissile material in a carrier liquid, such as common or heavy water, is circulated by means of a pump 4.

In the circulation conduit 2, a device 5 is inserted for the continuous removal of gaseous fission products and the recombination of the gaseous decomposition products of the carrier liquid. In a by-pass conduit 6 there is a device 7 for the continuous removal of dissolved fission products from part of the circulating nuclear fuel suspension.

The entire system is pressure resistant. The heat exchanger 3 receives a coolant through conduit 8 and the vapour developed is discharged through a conduit 9 to a power plant (not shown in the drawing).

The whole system in enclosed in a radiation shield 10, made, e.g., of concrete, which in turn is enclosed within a non-pressure-resistant shell 11 with a cover 12, made e.g. of sheet steel.

The space within the shell 11 is connected, through a low-resistance conduit 13, with the feed conduit 14 of a wet gasholder 15. In the connecting conduit 13, there is a condenser 16 to which a collecting vessel 17 for the condensate is connected.

In order to obtain a higher degree of safety and to simplify the construction the various parts of the plant are largely sunk into the soil 18.

Figure 2:
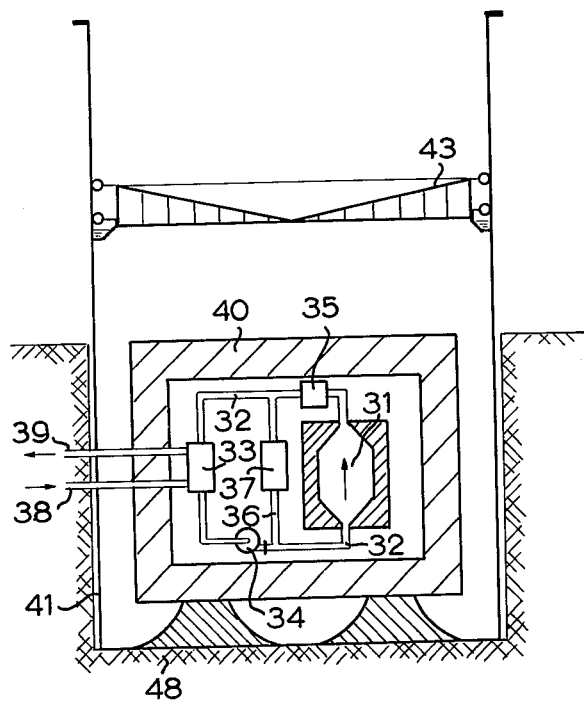
FIGURE 2 is a view similar to FIGURE 1 but employing a dry gas holder.

Referring to FIGURE 2, there is provided a reactor vessel 31, a heat exchanger 33 and a circulation conduit 32, through which a suspension of uranium oxide or a similar fissile material in a carrier liquid, such as common or heavy water, is circulated by means of a pump 34.

In the circulation conduit 32, a device 35 is inserted for the continuous removal of gaseous fission products and the recombination of the gaseous decomposition products of the carrier liquid. In a by-pass conduit 36 there is a device 37 for the continuous removal of dissolved fission products from part of the circulating nuclear fuel suspension.

The entire system is pressure resistant. The heat exchanger 33 receives a coolant through conduit 38 and the vapour developed is discharged through a conduit 39 to a power plant (not shown in the drawing).

The whole system is enclosed in a radiation shield 40, made, e.g., of concrete, which in turn is enclosed within a non-pressure-resistant shell 41. Provided within the shell 41 there is a dry gasholder the top of which is represented by the vertically movable piston 43.

*Example I*

In the operation of a plant as shown in the drawing, there is used as the carrier liquid for the circulating nuclear fuel suspension 20 metric tons of heavy water, temperature 300° C., pressure 100 atm. gauge.

In order to obtain a sufficient degree of safety for the surroundings against the scattering of radio-active heavy water gas or vapour, a wet gasometer 15 with an effective capacity of 3000 m.$^3$ is used.

The shell 11 is non-pressure-resistant and does not need to be larger than is required for accommodating the nuclear reactor and associated apparatus and for providing the necessary work space.

By way of comparison, it may be stated that if, in a corresponding case, an ordinary pressure-resistant non-expansible shell according to prior proposals were employed it would require to have an internal volume of at least 100,000 m.$^3$ to provide a sufficient degree of safety. If, with a nuclear reactor operation as depicted in Example I, there is employed, according to the above-described alternative embodiment of the invention, instead of the shell 11, a shell in the form of a dry gasholder, with the nuclear reactor and associated apparatus located within the lower part of the said dry gasholder, and the separate gasholder 15 is dispensed with, the dry gasholder would require to have an effective volume of 10,000 m.$^3$ in order to provide adequate in carrying out a nuclear fission reaction with a nuclear fuel suspension in the amount and at the temperature and pressure stated in Example I.

*Example II*

If, with a nuclear reactor operation as depicted in Example I there is employed, according to the above-described alternative embodiment of the invention, instead of the shell 11, a shell in the form of a dry gasholder, with the nuclear reactor and associated apparatus located within the lower part of the said dry gasholder, and the separate gasholder 15 is dispensed with, the dry gasholder would require to have an effective volume of 10,000 m.$^3$ in order to provide adequate safety in carrying out a nuclear fission reaction with a nuclear fuel suspension in the amount and at the temperature and pressure stated in Example I.

We claim:

1. In a nuclear reactor plant for the generation of energy by means of a self-sustaining neutron chain nuclear fission reaction and requiring the provision of a gas-tight enclosure affording sufficient volume for containing radio-active substances which could develop in the event of leakage from the nuclear reactor or associated apparatus, for containing such gases, of a shell enclosing the said reactor and said associated apparatus of an expansible gasholder located separately from the shell and connected to said shell so as to permit gas to flow with little resistance from the shell into the said gasholder.

2. Nuclear reactor plant according to claim 1, wherein the enclosing shell and the expansible gasholder are connected by way of a condenser with which a storage space for the condensate is associated.

3. Nuclear reactor plant according to claim 1, wherein the expansible gasholder is a wet gasholder.

4. Nuclear reactor plant for the generation of energy by means of a self-sustaining neutron chain nuclear fission reaction and requiring the provision of a gas-tight enclosure affording sufficient volume for containing radio-active substances which could develop in the event of leakage from the nuclear reactor or associated apparatus, and provided, for containing such gases, with a shell enclosing the said reactor and said associated apparatus the improvement that the said enclosing shell is constructed as an expensible gasholder.

5. Nuclear reactor plant according to claim 4, wherein the enveloping shell is constructed as a dry gasholder.

References Cited in the file of this patent

UNITED STATES PATENTS

| | | |
|---|---|---|
| 1,451,011 | Dreffein | Apr. 10, 1923 |
| 1,753,401 | Bucking | Apr. 8, 1930 |
| 2,856,339 | Wigner et al. | Oct. 14, 1958 |

OTHER REFERENCES

Beall et al.: "International Conference on the Peaceful Uses of Atomic Energy," vol. 3, pp. 266, 268–269, August 1955, U.N. Publication, N.Y. Copy in Sci. Lib.